United States Patent [19]

Reinhardt et al.

[11] 3,985,571

[45] Oct. 12, 1976

[54] PROCESS FOR THE PRODUCTION OF BERLIN BLUE

[75] Inventors: Helmut Reinhardt, Rodenkirchen; Karl Trebinger; Gottfried Kallrath, both of Wesseling, all of Germany

[73] Assignee: Deutsche Gold- und Silber-Scheideanstalt vormals Roessler, Germany

[22] Filed: June 26, 1975

[21] Appl. No.: 590,469

Related U.S. Application Data

[62] Division of Ser. No. 438,710, Feb. 1, 1974, Pat. No. 3,915,733.

[30] Foreign Application Priority Data

Feb. 19, 1973 Germany............................ 2308122
Dec. 10, 1973 Germany............................ 2361354
Dec. 18, 1973 Germany............................ 2362849
Dec. 18, 1973 Germany............................ 2362850

[52] U.S. Cl................................. 106/304; 423/367
[51] Int. Cl.² ........................................ C09C 1/26
[58] Field of Search ...................... 106/304, 288 B; 423/367

[56] References Cited

UNITED STATES PATENTS 2,005,697  6/1935  Grove ................................ 106/304
2,005,698  6/1935  Grove ................................ 106/304

*Primary Examiner*—Winston A. Douglas
*Assistant Examiner*—J. V. Howard
*Attorney, Agent, or Firm*—Cushman, Darby & Cushman

[57] ABSTRACT

Berlin blue is produced by converting (a) calcium ferrocyanide, sodium ferrocyanide or magnesium ferrocyanide with (b) an iron II salt at a pH below 7 to an acidic iron II salt of ferrocyanic acid $FeH_2[Fe(CN)_6]$. The calcium or sodium ions can be washed out of the precipitate of the ferrocyanic salt. The precipitate is treated with (c) an inorganic or organic potassium salt to form Berlin white and then oxidized to Berlin blue. Alternatively, (a), (b) and (c) can be reacted together at a temperature of 20° to 60°C. to form Berlin white directly.

12 Claims, No Drawings

PROCESS FOR THE PRODUCTION OF BERLIN BLUE

This is a division of application Ser. No. 438,710 filed Feb. 1, 1974, now U.S. Pat. No. 3,915,733.

Berlin blue, the iron III salt of ferrocyanic acid, as is known, belongs to the most important blue colors and is added in lacquers. It is not produced directly but instead by way of the so-called Berlin white, an iron II salt of ferrocyanic acid which is oxidized with various oxidizing agents, usually with a chlorate, to form the Berlin blue. Examples of oxidizing agents include for example sodium chlorate, potassium chlorate or sodium chromate.

Neither the Berlin blue nor the Berlin white are pure iron III or iron II salts of ferrocyanic acid; besides iron, there are always other ions involved in the salt formation. However, precisely these ions give the blue the characteristic shades.

An especially highly valuable Berlin blue is obtained in the presence of potassium ions; the products thus formed are strongly colored and have a characteristic bronze tone. Therefore, the starting material for this type of blue quality is preferably potassium ferrocyanide. Potassium ferrocyanide, however, is an expensive product and as known is produced by way of the calcium-potassium-double salt with potash.

Therefore, there have already been various attempts to replace potassium ferrocyanide by cheaper products. However, with sodium ferrocyanide as the starting material, there is not attained as good a color shade; besides, the blue is not so strongly colored as the so-called Prussian blue.

To be sure the tone and strength of the pigmentation can be improved by addition of ammonium salts, however, these must be added in large amounts if the product should possess a strongly colored and bronzized blue and thereby create a further waste water problem.

Therefore, the object of the invention is the production of strongly colored Berlin blue with a bronze tone without creating a waste water problem in such production and at the same time a reduction in cost of potassium compounds.

It has now been found that strongly colored Berlin blue with a bronze tone can be recovered if calcium ferrocyanide or sodium ferrocyanide is reacted with an iron II salt at a pH below 7 to form an acidic iron salt of ferrocyanic acid ($FeH_2[Fe(CN)_6]$), and, in a given case, the calcium or sodium ions washed out of the precipitate of the ferrocyanic acid salt, whereupon the precipitate is converted into Berlin white by treatment with inorganic or organic potassium salts at pH values of from < 1 to 6 and then is oxidized in known manner, e.g., with sodium chlorate, sodium chromate, hydrogen peroxide or potassium chlorate, to Berlin blue.

Calcium ferrocyanide is added as an aqueous solution of the solid material or as non-isolated product in the form of reaction solution resulting from its production from equal molar parts of calcium ferrocyanide and calcium chloride. Besides, it is also possible to start first with calcium hydroxide, hydrogen cyanide and ferro salts, e.g., ferrous chloride, ferrous sulfate or ferrous nitrate and then to add this reaction mixture in the process of the invention. In place of 3 moles of calcium hydroxide there can also be used 2 moles of calcium hydroxide and 1 mole of calcium carbonate according to the process of German Pat. No. 1,957,527 and the corresponding Reinhardt et al U.S. Pat. No. 3,764,659. The entire disclosure of Reinhardt is hereby incorporated by reference.

Sodium ferrocyanide is generally used as the aqueous salt solution.

As the iron II salt there can be used all of those which are soluble in water and, if in using calcium ferrocyanide there is desired a completely pure product, do not form difficultly soluble compounds during the entire period of the reaction. Among these are included iron II chloride, iron II nitrate and, in a given case, iron II sulfate. Especially preferred is iron II chloride, which can also be used in the form of waste acids from pickling.

As stated, the reaction takes place at pH values below 7, i.e., also in adjusting the pH value, there must be avoided the occurrence of difficultly soluble calcium compounds. Thus, the pH value, using sodium ferrocyanide, can be higher than in using the calcium ferrocyanide. Preferably in both cases are pH values not higher than 1.

The regulation takes place in known manner with acids or buffer solutions. If the pH value is too low before the addition of the potassium ions, it can be adjusted in known manner by addition of lye.

The precipitate of the acidic iron salts of ferrocyanic acid can now be further treated either directly with potassium salts in the solution or it is first washed, preferably according to the process in German application P 2214826.1 or corresponding Reinhardt et al U.S. application Ser. No. 343,170, filed Mar. 20, 1973, now U.S. Pat. No. 3,915,733. The entire disclosure of the Reinhardt U.S. application is hereby incorporated by reference.

The washed or unwashed precipitate of the acidic iron-II-ferrocyanide is then further reacted with inorganic or organic potassium salts such as potassium chloride, potassium acetate, potassium citrate, potassium propionate, potassium benzoate and potassium sulfate. Preferably potassium sulfate is not added in the presence of calcium ions. The potassium salt is present in the form of aqueous solutions with concentrations of 3 to 40 weight %, preferably as solutions containing 10 to 20 weight %. It is also possible to add the potassium salt in solid form into the reaction solution.

The reaction of the acidic iron II ferrocyanide to form the so-called Berlin white can take place at low temperatures such as room temperature or slightly elevated temperatures. Preferably, however, there are used temperatures of from 60°C to the boiling temperatures of the particular solutions, in order to increase the speed of the reaction. In addition to normal pressure, there can also be used increased pressures if the reaction time must be strongly shortened for special reasons.

The precipitate of Berlin white which accumulates with or without separation of the aqueous solution can be oxidized in known manner by the addition of alkali chlorate solutions, e.g., sodium chlorate or potassium chlorate, aqueous hydrogen peroxide solutions or aqueous alkali chromate solutions, e.g., sodium chromate and potassium chromate, at temperatures from 20° to 100°C, preferably about 60°C. The washing of the accumulated precipitate from Berlin white can likewise be carried out according to German application P 2214826.1 and corresponding Reinhardt U.S. Pat. No. 343,170, filed March 20, 1973.

All of the reactions take place in open agitator vessels. Only if the conversion of the acidic iron II ferrocyanide into Berlin white is to be carried out under pressure are autoclaves employed.

The proportions of the reactants in the individual steps generally correspond to the equivalent proportions. In a given case, small excesses can be added.

Unless otherwise indicated, all parts and percentages are by weight.

The technical advance of the process of the invention is in the production of strongly colored Berlin blue with a bronze tone, thus having the properties of the so-called Prussian blues, namely, with saving of half of the otherwise customary amount of potassium ions, i.e., the saving of two equivalents of potassium ions based on the calcium ferrocyanide originally added.

The invention is further explained in connection with the following examples.

EXAMPLE 1

200 Grams of iron (II) chloride ($FeCl_2 \cdot 4H_2O$) were dissolved in one liter of water and this solution was treated with 80 ml of 2 normal hydrochloric acid. There were introduced into this solution within 30 minutes in the cold a solution of 420 grams of $Ca_2[Fe(CN)_6] \cdot 12H_2O$ in 2 liters of water. The pH value after the precipitation was < 1. The pH of the suspension was adjusted to 1 with 22% KOH. This required 33 ml of the KOH solution. Without separation of the calcium salt the mixture was heated to 100°C, treated with 2 moles of KCl and then boiled for 30 minutes. The pH value remained at 1. The Berlin white was oxidized to Berlin blue with an equivalent amount of 20% aqueous potassium chlorate solution. After the oxidation, the soluble salts were washed out by decantation up to an electrical conductivity of 1500 micromohs ($1500\mu$ ohms$^{-1}$). The washed precipitate was filtered off and dried at 80°C.

EXAMPLE 2

Berlin blue was produced under the conditions set forth in Example 1, however, replacing the pure starting materials as follows. In place of the 200 grams of iron (II) chloride there were used 1.05 liters of a pickling solution containing 122 grams/liter of $FeCl_2$, 2 grams/liter of $NiCl_2$ and 5 grams/liter of $ZnCl_2$. The solution of crystalline calcium ferrocyanide in water was replaced by 1.45 liters of a solution of 290 grams/liter of $Ca_2[Fe(CN)_6] \cdot 12H_2O$ and 63 grams/liter of $CaCl_2$. The Berlin blue obtained was of a good quality. The yield based on the ferrocyanide added was 95%. The calcium ferrocyanide solution was produced from milk of lime, hydrocyanic acid and iron chloride.

EXAMPLE 3

700 Ml of iron (II) sulfate solution having an $FeSO_4 \cdot 7H_2O$ content of 270 grams/liter was heated with 80 ml of 2 normal sulfuric acid. There were added to this solution at room temperature 2540 grams of a solution which contained 142 grams/liter of $Na_4[Fe(CN)_6] \cdot 10H_2O$ and 18 grams/liter of KOH. The pH value was 2 and first rose toward the end of the precipitation to 7. After stirring for 5 minutes more it was washed 4 times by decantation. A non-ionogenic flocculating agent was used therewith. The washed precipitate was heated to 100°C, and then treated with 66 grams of KCl. The suspension was boiled for another ½ hour, then the salt concentration was reduced in half by decanting once and making up with water. The product was oxidized at 50°C with an equivalent amount of 20% aqueous potassium chlorate. The Berlin blue was washed, dried and ground. The investigation of the color produced showed that this Berlin blue corresponded in color strength, shade, ability to react and softness exactly to a Prussian blue of good quality.

EXAMPLE 4

The procedure was carried out as in Example 3. The iron sulfate was replaced by iron II chloride and in place of sodium hexacyanoferrate (II) there was added the corresponding calcium salt. The addition of caustic potash solution to the ferrocyanide solution was dispensed with. This blue also possessed the quality of a good Prussian blue.

The oxidation of Berlin white to Berlin blue in all examples was carried out in known manner using an equivalent amount of a 20 weight % potassium chlorate solution.

In the process just described, the Berlin white was produced in a plurality of precipitation steps.

In further development of the process it has now been found that the formation of Berlin white can be carried out in a single precipitation step of the three reactants calcium or sodium ferrocyanide, iron II salt and potassium salt are present simultaneously in the reaction container and are reacted to Berlin white at an initial temperature of about 20°C. to 60°C. In a given case the reaction can thereafter be accelerated by increasing the temperature, e.g., from 60°C. up to the boiling temperature.

Preferably all of the reactants are introduced into the reaction container simultaneously but from separate addition apparatus. In this connection it is advantageous if sufficient water is present in the reaction container that the suspension formed upon introduction of the reactants can be immediately stirred. The amount of water present should, of course, not exceed 10 weight % of the suspension formed.

It is also suitable to have present initially in the container the potassium salt solution, the ferrous salt solution or a mixture of both of these solutions. In this case also the formation of the Berlin white occurs immediately after introduction of the residual reactants.

The precipitation preferably is carried out at 30° to 50°C.; especially good results are obtained at 40°C. In order to carry the formation of the Berlin white to a quick conclusion, it is recommended, as already set forth, to increase the temperature at the end of the reaction to the boiling temperature. This can be attained preferably by the use of steam either in direct manner or by using a closed container.

Preferably stirring is continued during the entire formation of the Berlin white.

The reactants can be added in stoichiometric amounts as set forth above, but there can also be maintained constant excesses of ferrocyanide and/or iron II ions as set forth above. Generally these excesses are 1 to 10 mol %.

Preferably there is present an excess of ferrous salt throughout the entire formation of Berlin white; namely, for example, by the initial presence of only a small portion of about 2 to 6 mol % in the reaction container. Then in the presence of this preadditive there is simultaneously added the stoichiometrical amounts of the three reactants. The reactants are employed in the same forms and in the same concentrations as set forth above.

The pH values during the entire reaction to form the Berlin white are the same as those set forth above and should not exceed 6. Preferably the pH is about 1. If alkaline reacting materials are used to adjust the pH, preferably there are employed potassium hydroxide or potassium carbonate.

The working up of the Berlin white is exactly as set forth above as is the oxidation of the Berlin white to Berlin blue.

The foreign salts, however, are best removed first after the oxidation of the Berlin white, preferably by decantation of the Berlin blue in the presence of a flocculating agent, especially a nonionic or weakly ionic flocculating agent (derivatives of polyacrylic acid).

The technical advance of this feature of the invention is in the simplification of the procedure outlined above in connection with Examples 1–4. Thus by use of an excess of one or the other or by the use of an excess of both the ferrocyanide ferro ions during the entire production of the Berlin white, it is possible to have a more uniform precipitation.

Likewise it is easier to keep the pH value constant in a single precipitation step than in two steps with voluminous precipitates.

EXAMPLE 5

In the production of Berlin blue in a single precipitation step there were used the following solutions.

1. An iron II chloride solution in water containing 195 grams of $FeCl_2 \cdot 4H_2O/l$.
2. A calcium ferrocyanide solution in water containing 205 grams of $Ca_2[Fe(CN)_6] \cdot 12H_2O/l$ and 45 grams of $CaCl_2/l$.
3. A potassium chloride solution in water containing 220 grams of KCl/l.
4. 22 weight % potash lye used to regulate the pH.
5. 10 weight % hydrochloric acid to regulate the pH.

As the reaction container there was employed a 5 liter glass beaker that was equipped with a stirrer, a pH electrode and dropping funnels for the reaction components.

First there were dissolved as much of the iron II chloride solution in 200 ml. of water that 25 ml. consumed 5 ml. of 0.1 N potassium permanganate solution. The mixture of the solution of ferrous chloride and 200 ml. of water was placed in the reaction container and the pH adjusted to 1 by addition of 10 weight % hydrochloric acid.

The reactants calcium ferrocyanide, iron II chloride and potassium chloride were simultaneously added within one half hour into the reactor with its preplaced contents. The concentrations were adjusted so that there was used 1 liter of iron II chloride solution for 2 liters of calcium ferrocyanide solution. During the entire reaction time of 30 minutes there were uniformly dropped in 550 ml. of potassium chloride solution.

The pH value was maintained at 1 throughout the addition of hydrochloric acid. After the end of the precipitation, the pH was adjusted to 4 with potash lye. Then it was heated to the boiling point with stirring and boiled for 1.5 hours. The precipitate of Berlin white which occurred was cooled to 60°C. and oxidized to Berlin blue in known manner by addition of hydrochloric acid and potassium chlorate, e.g., using an equivalent amount of 20% aqueous potassium chlorate. The blue was washed free of salt by decantation and after being filtered off dried at 60°C.

EXAMPLE 6

The operation was the same as described in Example 5 but the pH was held at 5 during the precipitation. A strongly colored Berlin blue was obtained.

EXAMPLE 7

The procedure was the same as that described in Example 5 but in place of the pure iron II chloride, there was employed the so called waste acid (from pickling) containing 202 grams of $FeCl_2 \cdot 4H_2O$ per liter. In this case also there was obtained a Berlin blue of good quality.

EXAMPLE 8

The starting materials, as well as the general operating procedure, were the same as in Example 5. The time of KCl addition was changed since the potassium chloride was present in the mixture in the reactor prior to the reaction. In this manner also a strongly colored product was obtained.

In another aspect of the invention it has been found that there can be used magnesium ferrocyanide in place of calcium or sodium ferrocyanide. Thereby it is possible to operate preferably in more weakly acid medium without the quality of the Berlin blue formed suffering. As a result, it allows the process to be carried out on a large scale in non-acid resistant apparatus.

When using magnesium ferrocyanide, the preferred pH is 4–6, especially good products are obtained at a pH of about 5.

A further advantage in the use of mmagnesium ferrocyanide is the possibility of using iron II sulfate since it does not form an insoluble salt with magnesium. There can be employed any of the iron II salts set forth above as suitable with sodium ferrocyanide.

In a further development of the process, it has been found that the softness of the endproduct "Berlin blue" can be improved very considerably if the reaction of calcium or sodium ferrocyanide with the iron II salt to form the acidic iron II ferrocyanide is carried out at a temperature of 25° to 60°C. Especially preferred is a temperature of 40°C.

EXAMPLE 9

200 grams of iron II chloride ($FeCl_2 \cdot 4H_2O$) were dissolved in a liter of water and this solution was treated with 80 ml of 2N hydrochloric acid. There were introduced into this solution at 40°C. inside 30 minutes a solution of 420 grams of $Ca_2[Fe(CN)_6] \cdot 12H_2O$ dissolved in 2 liters of water. After the precipitation the pH was less than 1. The pH value of the suspension was adjusted to 1 with 22% KOH. This is required 35 ml. Without separation of the calcium salt the mixture was heated to 100°C. with 2 moles of KCl and then boiled for 30 minutes. The pH value remained at 1. The Berlin white was oxidized to Berlin blue at 60°C. After the oxidation the soluble salts were washed out to an electrical conductivity of 1,500 micro mohs. The washed precipitate was filtered off and dried at 60°C. The dried filter cake was ground and sieved off through a 10,000 mesh sieve. 500 mg. of blue wre weighed into 1 gram of linseed oil, mixed with a spatula and then treated in the abrading machine. The number of revolutions required to obtain a fixed particle size (about 5–10 microns) was ascertained. 400 revolutions were required.

EXAMPLE 10

A comparison test in which the acidic iron II ferrocyanide was precipitated at room temperature (20°C.) required 600 revolutions.

EXAMPLE 11

1 liter of an iron II sulfate solution (155 grams of $FeSO_4/l$) were treated within 30 minutes with 2 liters of a magnesium ferrocyanide solution (105 grams of $Mg_2[Fe(CN)_6]/l$). Stirring was carried out during the cyanide addition. The pH was held at about 5 during the entire precipitation process. The suspension was heated to 100°C. without separation of the magnesium salt, treated with 2 moles of KCl and then boiled for 1 hour. The pH value was not changed thereby. After the aging process the Berlin white was oxidized to Berlin blue by addition of hydrochloric acid and sodium chlorate. Then the soluble salts were washed out by decantation to an electrical conductivity of 1,500 micro mohs. The washed precipitate was filtered off and dried at 60°C. The color tests showed that this Berlin blue in color strength, color tone, reactivity and softness corresponded exactly to a Berlin blue of good quality.

Magnesium ferrocyanide can be employed in aqueous solutions containing 30–500 grams/l thereof. Preferably there are employed solutions with about 100 grams of magnesium ferrocyanide per liter. The solutions were obtained by reaction of calcium ferrocyanide with soluble magnesium salts, for example, magnesium sulfate or magnesium chloride and separation of the calcium salt formed. What is claimed is:

1. A process comprising reacting in water (a) a member of the group consisting of calcium ferrocyanide, sodium ferrocyanide and magnesium ferrocyanide with (b) a water soluble iron II salt which does not form a water insoluble salt with calcium, magnesium or sodium and (c) with a water soluble potassium salt at a pH below 7 to form Berlin white, said process being carried out in one step in which the reaction of (a), (b) and (c) is carried out simultaneously at a temperature commencing between 20 and 60°C.

2. A process according to claim 1 wherein the ferrocyanide (a) is calcium ferrocyanide or sodium ferrocyanide.

3. A process according to claim 2 wherein after the initial reaction the temperature is increased to between above 60°C. and the boiling point.

4. A process according to claim 3 wherein the temperature is increased to the boiling point.

5. A process according to claim 2 wherein the process is initiated at 30° to 50°C.

6. A process according to claim 5 wherein the process is initiated at about 40°C.

7. A process according to claim 2 wherein at least one of (a) and (b) is employed in an amount of 1 to 10 mole % excess of the stoichiometric amount.

8. A process according to claim 7 wherein the iron II salt is present in the reaction vessel before reaction is begun in an excess of 2 to 6 mole % over the stoichiometrical amount and reactants (a), (b) and (c) are then introduced simultaneously in stoichiometrical amounts into the reactor.

9. A process according to claim 2 wherein the iron II salt is present in the reaction vessel before reaction is begun in an excess of 2 to 6 mole % over the stoichiometric amount and reactants (a), (b) and (c) are then introduced simultaneously in stoichiometrical amounts into the reactor.

10. A process according to claim 1 wherein about equivalent amounts of (a), (b) and (c) are employed.

11. A process according to claim 1 wherein (a) is the sole ferrocyanide employed.

12. A process according to claim 11 wherein the reactants consist of (a), (b) and (c).

* * * * *